Sept. 29, 1936.　　　R. W. DERK　　　2,055,786
SAFETY BRAKE FOR AUTOMOBILES
Filed May 2, 1936　　　3 Sheets-Sheet 1

Sept. 29, 1936.    R. W. DERK    2,055,786
SAFETY BRAKE FOR AUTOMOBILES
Filed May 2, 1936    3 Sheets-Sheet 3
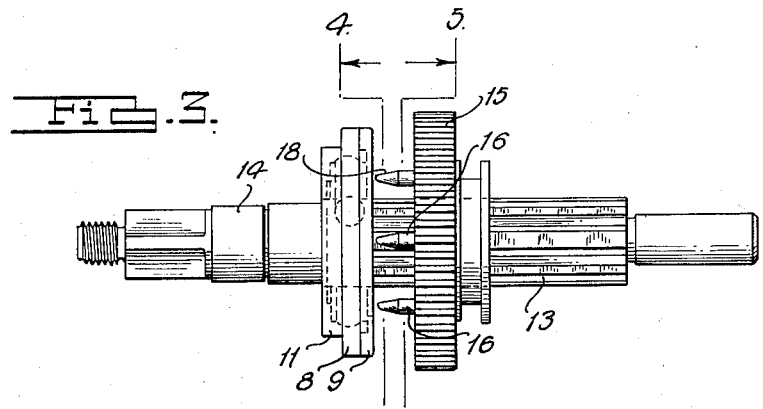
Fig. 3.
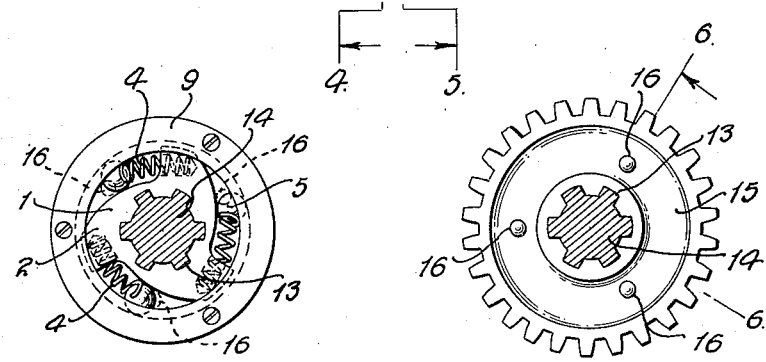 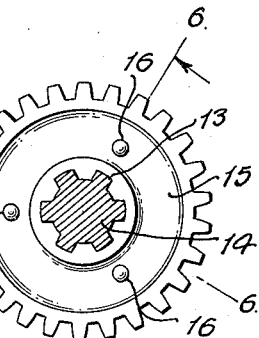
Fig. 4.    Fig. 5.
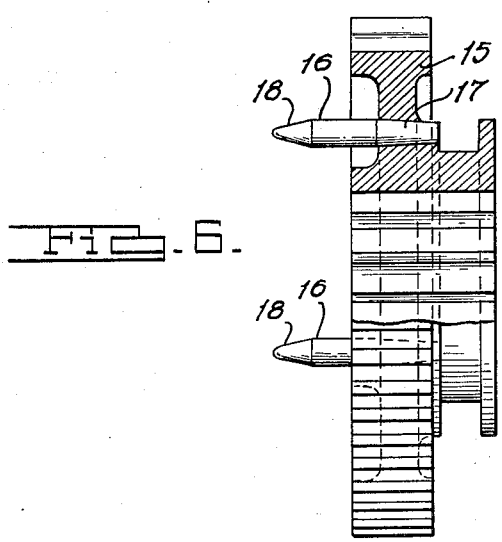
Fig. 6.
INVENTOR
RAY W. DERK.
BY
ATTORNEY Patented Sept. 29, 1936

2,055,786

UNITED STATES PATENT OFFICE 2,055,786

SAFETY BRAKE FOR AUTOMOBILES

Ray W. Derk, Flint, Mich., assignor of forty-five one-hundredths to Walter L. Evans, Saginaw, Mich.

Application May 2, 1936, Serial No. 77,563

5 Claims. (Cl. 192—4)

This invention relates to safety brakes for automobiles and the object of the invention is to provide a device which will normally prevent retrograde or reverse movement of an automobile except when the reverse gear is moved into position to drive the automobile rearwardly.

One of the particular objects of the invention is to provide a means which will prevent reverse movement of the automobile whether the forward spe d gears are in mesh or not and whether the clutch is in or out.

A further object of the invention is to provide a safety brake for automobiles including an over-running clutch mounted in the transmission on the main drive shaft and normally allowing rotation of the drive shaft in one direction and preventing rotation of the drive shaft in the opposite direction.

Another object of the invention is to provide an overrunning clutch including a series of spring pressed balls normally riding in position to lock the shaft from rotation upon reverse movement thereof, the reverse gear being provided with a pin for each ball adapted to move the respective ball out of locking position when the reverse gear is moved into position to drive the automobile to the rear.

A further object of the invention is to provide an overrunning clutch including a stator secured in the inner wall of the transmission and a rotor secured to the drive shaft, the reverse gear being also splined or keyed to the shaft and movable longitudinally thereof toward the clutch rotor to disengage the balls of the clutch and allow forward or reverse rotation of the shaft.

These objects and the several novel features of the invention are hereinafter more fully described and claimed and the preferred form of construction by which these objects are attained is shown in the accompanying drawings in which—

Fig. 3 is an assembly view of the main drive shaft including the over-running clutch and reverse gear mounted thereon.

Fig. 4 is a section taken on line 4—4 of Fig. 3 and showing the face of the over-running clutch.

Fig. 5 is a section taken on line 5—5 of Fig. 3 and showing the face of the reverse gear.

Fig. 6 is an enlarged section taken on line 6—6 of Fig. 5.

Fig. 7 is an enlarged section through the over-running clutch.

Fig. 8 is an edge view of the rotor including the springs and balls.

Fig. 9 is a face view of the rotor showing the springs and balls and the stator in section.

Figure 1:
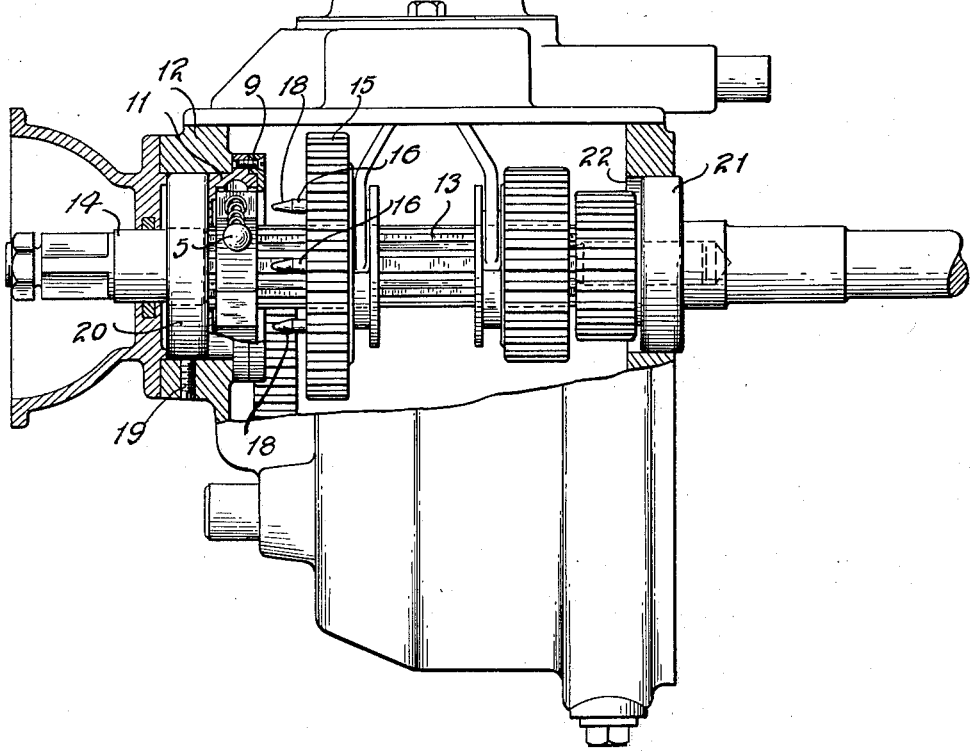
Fig. 1 is an elevation of an automobile transmission partially in section showing the installation of my safety brake.

The rotor 1 of the over-running clutch is shown more in detail in Fig. 9 and is provided with a series of three extending lugs 2 each having a bore 3 to receive a spring 4. Each spring 4 engages against a ball 5 and tends to press this ball outwardly along the cam faces 6 of the rotor into engagement with the stator.

These balls ride in a curved way 7 in the stator 8 and this stator 8 is provided with a plate 9 which is secured to the stator and acts as a retainer for the rotor in that it extends over the edges of the lugs 2 of the rotor and this plate 9 fitting against the shoulder 10 acts as a re-enforcement for the stator in that should the stator casing crack under excessive pressure, the plate 9 engaging against the shoulder 10 will prevent the stator from coming to pieces.

The stator 8 is provided with an annular shoulder 11 which is a press fit in the transmission housing portion 12 shown in Fig. 1 so that this stator will remain in stationary position in the transmission housing. The rotor 1 is shaped at the center to fit the splines 13 of the drive shaft 14 and thus the rotor is secured to rotate with the drive shaft while the stator is held stationary in the transmission housing. This arrangement will thus allow counter-clockwise rotation of the rotor as will be understood from Figs. 4 and 9 but upon clockwise rotation of the drive shaft 14 and rotor the balls 5 will wedge between the cam faces 6 of the rotor and the stator and thus will lock the rotor and shaft 14 to the stator. This effect is very desirable under all normal driving conditions in that in driving up a hill and coming to a stop the over-running clutch will immediately lock and prevent the automobile from retrograde movement. As the usual pedal operated clutch is mounted between the transmission and the engine, the operation of the clutch pedal will have no effect in the operation of the safety brake device. This is due to the fact that the drive shaft 14 is connected through a universal joint to the rear axle differential and through the differential to the rear wheels of the automobile.

Thus, whenever the drive shaft 14 comes to a stop it is automatically in locked position against reverse rotation of the drive shaft 14. Another advantage of this device is that the automobile may be stopped in ascending a hill without the use of brakes and may be started from a stopped position in the same manner as the car is started on a level road.

Figure 2:
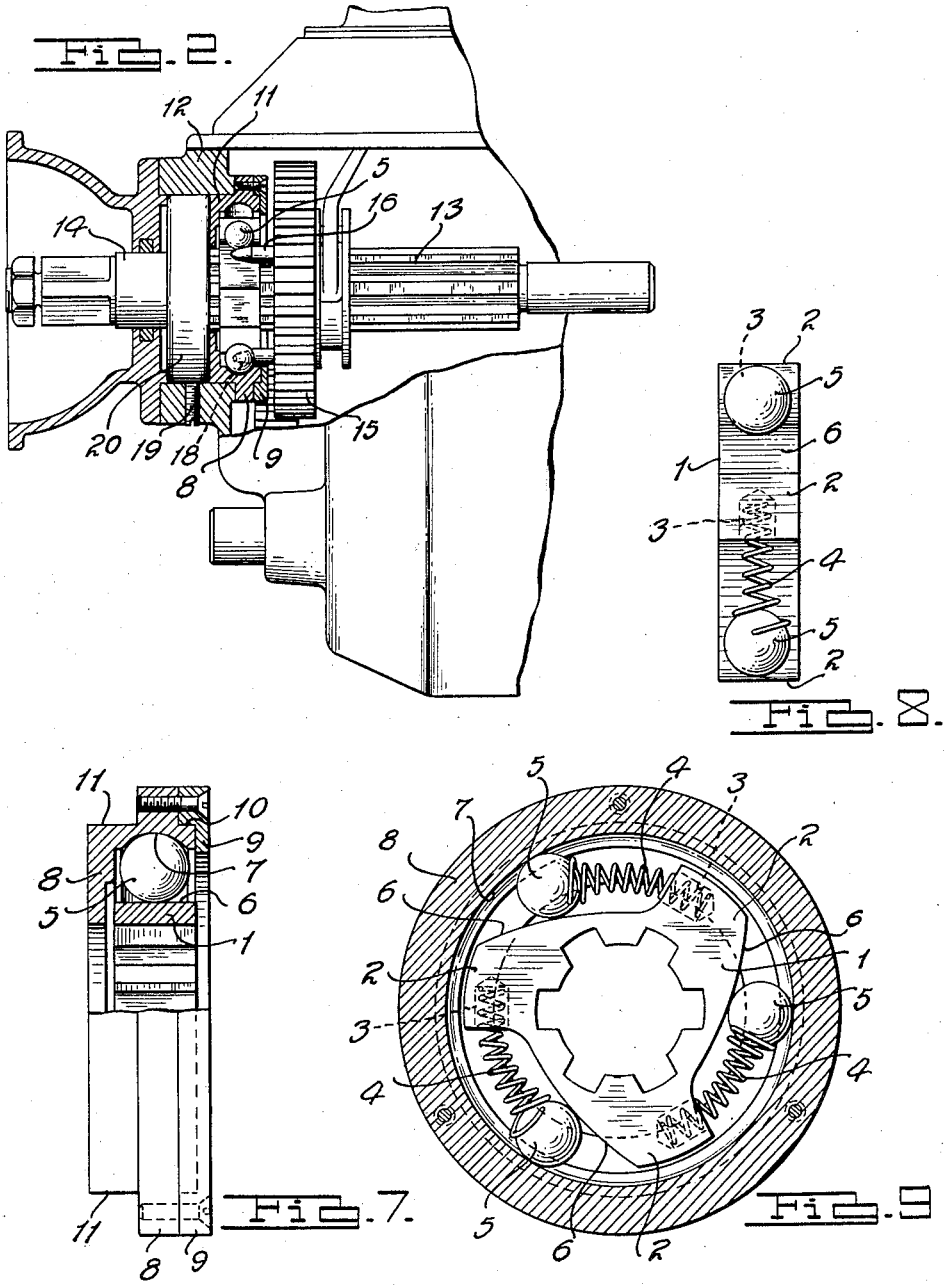
Fig. 2 is a partial section similar to Fig. 1 showing the reverse gear moved to operative position to disengage the safety brake.

While this locking effect is very beneficial when the gear shift is in neutral position or in any forward speed, it is necessary to unlock or disengage the over-running clutch when the transmission is shifted into reverse to allow the automobile to be driven rearwardly. For this purpose, the reverse gear 15 shown more particularly in Figs. 5 and 6 is shaped at the center to fit over the splines 13 of the drive shaft 14 and is slidable longitudinally of the shaft on these splines. As the rotor 2 is also shaped to fit the splines 13, the reverse gear 15 and rotor 2 are prevented from relative rotative movement. It is also necessary while sliding the reverse gear into mesh with the reverse idler that the over-running clutch be disengaged. For this reason, a series of three pins 16 are provided in the reverse gear 15. Each pin 16 is provided with a tapered portion 17 which is a press fit in the respective aperture in the reverse gear and the outer end of each pin 16 is provided with a conical point 18. These pins just fit within the inner edge of the plate 9 on the stator as will be understood more particularly from Figs. 1, 2, 3 and 4. As the reverse gear 15 is moved from the position shown in Fig. 1 to that shown in Fig. 2 the conical ends 18 of the pins 16 each engage against the respective ball 5 and move these balls in a clockwise direction against the tension of the springs 4 as will be understood from the dotted lines representing the pins 16 in Fig. 4.

In Fig. 4, the position of these pins 16 is indicated in dotted lines. In this figure it will be noted that the pins overlap the balls 5 so that as they are pressed inwardly the conical ends 18 of the pins engage the balls and move them out of wedging engagement between the cam faces 6 of the rotor and the way 7 for the balls in the stator. By this arrangement as the reverse gear is moved to position to drive the automobile rearwardly the balls of the over-running clutch are disengaged, at which time the shaft 14 is free to rotate in either direction. Thus, at this time the automobile may be readily driven to the rear. While it would be seldom used, it is also possible to allow retrograde movement of the automobile by gravity with this device. In order to do this when the car is ascending a hill, for instance, the reverse gear is moved into mesh with the reverse idler so that the pins 16 disengage the over-running clutch balls to free the shaft 14 and at this time by pushing in on the automobile clutch pedal, the automobile is free to roll to the rear or down hill by gravity.

A roller or ball bearing 20 is provided for the shaft 14, as shown in Fig. 1, and this bearing is a press fit in the same bore in the housing in which the shoulder 11 of the stator is a press fit and is secured in place by the set screw 19. At the opposite end, a bearing 21 is provided for the drive shaft and this bearing 21 is secured in the bore 22 of the transmission housing.

It is to be particularly noted that the reverse gear 15 and rotor 2 both fit on the splined portion 13 of the drive shaft 14 and thus no matter what the position of this drive shaft or whether it is rotating or not the pins 16 are always maintained in proper position axially in relation to the balls 5 so that at any time that the reverse gear is moved to the left of Fig. 1 or 3 the pins 16 will disengage the balls of the over-running clutch.

From the foregoing description it becomes evident that the device is very simple and efficient in operation, will automatically lock to prevent retrograde movement of the automobile and will automatically release upon engagement of the reverse gear and provides a device which accomplishes the objects described.

Having thus fully described my invention, its utility and mode of operation, what I claim and desire to secure by Letters Patent of the United States is—

1. In a safety brake for automobiles, a transmission housing, a splined drive shaft rotatably mounted in the transmission housing, an over-running clutch connected to the transmission housing and drive shaft, a series of spring pressed balls in the over-running clutch preventing rotation of the drive shaft in one direction and allowing rotation of the drive shaft in the opposite direction, a reverse gear slidably mounted on the splined drive shaft, a series of pins secured in the reverse gear, each pin being provided with a conical end, means for moving the reverse gear longitudinally of the drive shaft, the arrangement being such that when the reverse gear is moved toward the over-running clutch the conical ends of the pins of the reverse gear engage the balls and move them to inoperative position allowing rotation of the drive shaft in either direction.

2. In a safety brake for automobiles, a transmission housing, a splined drive shaft rotatably mounted in the transmission housing, an over-running clutch comprising a stator secured to the transmission housing about the drive shaft, a rotor secured to the splined drive shaft, the rotor being provided with a series of cam faces, a ball positioned on each cam face of the rotor, a spring urging each ball outwardly on its cam face into wedging engagement between the stator and respective cam face of the rotor, a reverse gear slidably mounted on the splines of the drive shaft, a series of pins carried by the reverse gear and arranged upon movement of the reverse gear longitudinally of the splined shaft toward the over-running clutch to engage the balls and move them out of locking position between the stator and the rotor, the rotor and reverse gear fitting the splines of the splined shaft and preventing relative rotation of the reverse gear in relation to the rotor.

3. In a safety brake for automobiles, a transmission housing, a splined drive shaft rotatably mounted in the transmission housing, a stator secured to the transmission housing about the drive shaft, a rotor secured to the drive shaft, a series of spring pressed balls between the stator and rotor arranged to prevent rotation of the drive shaft in one direction and allow rotation of the drive shaft in the opposite direction, a reverse gear slidably mounted on the splines of the drive shaft and a series of pins carried by the reverse gear and arranged to engage the balls and move them out of locking position as the reverse gear is moved into position to drive the automobile to the rear.

4. In a safety brake for automobiles, a transmission housing, a splined drive shaft rotatably mounted in the transmission housing, the transmission housing having a bore in one end, a ball bearing fitted tightly into one side of said bore, an over-running clutch fitted tightly into the other side of said bore, the over-running clutch including a series of spring pressed balls, a reverse gear slidable longitudinally of the drive shaft, a series of pins carried by the reverse gear, the arrangement being such that as the reverse gear is moved to driving position the pins engage the balls and move them to inoperative position allowing rotation of the drive shaft in either direction.

5. In a safety brake for automobiles, a transmission housing, a splined drive shaft rotatably mounted in the transmission housing, an over-running clutch connected to the drive shaft and preventing rotation of the drive shaft in one direction, a reverse gear slidable longitudinally of the drive shaft and a series of pins carried by the reverse gear and extending from the face thereof, the arrangement being such that as the reverse gear is moved to driving position the pins are moved into the over-running clutch to disengage the clutch and allow rotation of the drive shaft in either direction.

RAY W. DERK.